United States Patent
Wittendorfer

(10) Patent No.: US 9,327,323 B2
(45) Date of Patent: May 3, 2016

(54) METHOD AND A CLEANING SYSTEM FOR CLEANING INDUSTRIALLY PRODUCED COMPONENTS

(75) Inventor: Reiner Wittendorfer, Linz (AT)

(73) Assignee: TMS Turnkey Manufacturing Solutions GmbH, Linz (AT)

(*) Notice: Subject to any disclaimer, the term of this patent is extended or adjusted under 35 U.S.C. 154(b) by 168 days.

(21) Appl. No.: 13/878,521

(22) PCT Filed: Jul. 25, 2011

(86) PCT No.: PCT/EP2011/062726
§ 371 (c)(1),
(2), (4) Date: Apr. 9, 2013

(87) PCT Pub. No.: WO2012/048921
PCT Pub. Date: Apr. 19, 2012

(65) Prior Publication Data
US 2013/0192646 A1    Aug. 1, 2013

(30) Foreign Application Priority Data

Oct. 11, 2010 (AT) ................................ A 1686/2010

(51) Int. Cl.
| | |
|---|---|
| *B08B 3/04* | (2006.01) |
| *B08B 5/04* | (2006.01) |
| *B01D 53/00* | (2006.01) |
| *B01D 53/26* | (2006.01) |
| *B08B 3/02* | (2006.01) |
| *B08B 15/02* | (2006.01) |
| *F28D 21/00* | (2006.01) |
| *B01D 53/38* | (2006.01) |

(52) U.S. Cl.
CPC ................ *B08B 5/04* (2013.01); *B01D 53/002* (2013.01); *B01D 53/265* (2013.01); *B08B 3/02* (2013.01); *B08B 15/02* (2013.01); *F28D 21/0014* (2013.01); *B01D 53/38* (2013.01); *B01D 2257/80* (2013.01); *B01D 2258/02* (2013.01); *B01D 2258/06* (2013.01)

(58) Field of Classification Search
CPC ............ B08B 3/02; B08B 5/04; B08B 12/02; B01D 53/02; B01D 53/265
USPC ............................... 134/10, 11; 34/27, 34, 77
IPC .......................................................... B08B 3/04
See application file for complete search history.

(56) References Cited

U.S. PATENT DOCUMENTS

| | | | |
|---|---|---|---|
| 4,402,332 A | 9/1983 | Bradshaw et al. | |
| 4,537,120 A | 8/1985 | Josefsson | |
| 5,277,716 A | 1/1994 | Boppart et al. | |
| 6,187,099 B1 | 2/2001 | Blaudszun | |

FOREIGN PATENT DOCUMENTS

| | | |
|---|---|---|
| AU | 752 122 | 9/2002 |
| DE | 30 38 275 | 5/1982 |

(Continued)

*Primary Examiner* — David Redding
(74) *Attorney, Agent, or Firm* — Greenblum & Bernstein, P.L.C.

(57) ABSTRACT

In order to recover the resources (cleaning agent, heat) contained in the cleaning agent vapors suctioned off a cleaning system for cleaning industrially produced components, it is proposed to guide the suctioned-off waste air ($\dot{V}_{ab}$) in a recovery device (5) through a heat register (9) of a refrigeration device (6) and thereby to heat it substantially to the temperature of the waste air ($\dot{V}_{ab}$), and to supply the waste air ($\dot{V}_{ab}$) heated and dried in this manner to the cleaning chamber (2) in the region of a bulkhead door (16) as preheated dried supply air ($\dot{V}_{zu}$).

13 Claims, 2 Drawing Sheets

(56) References Cited

FOREIGN PATENT DOCUMENTS

Figure 1:
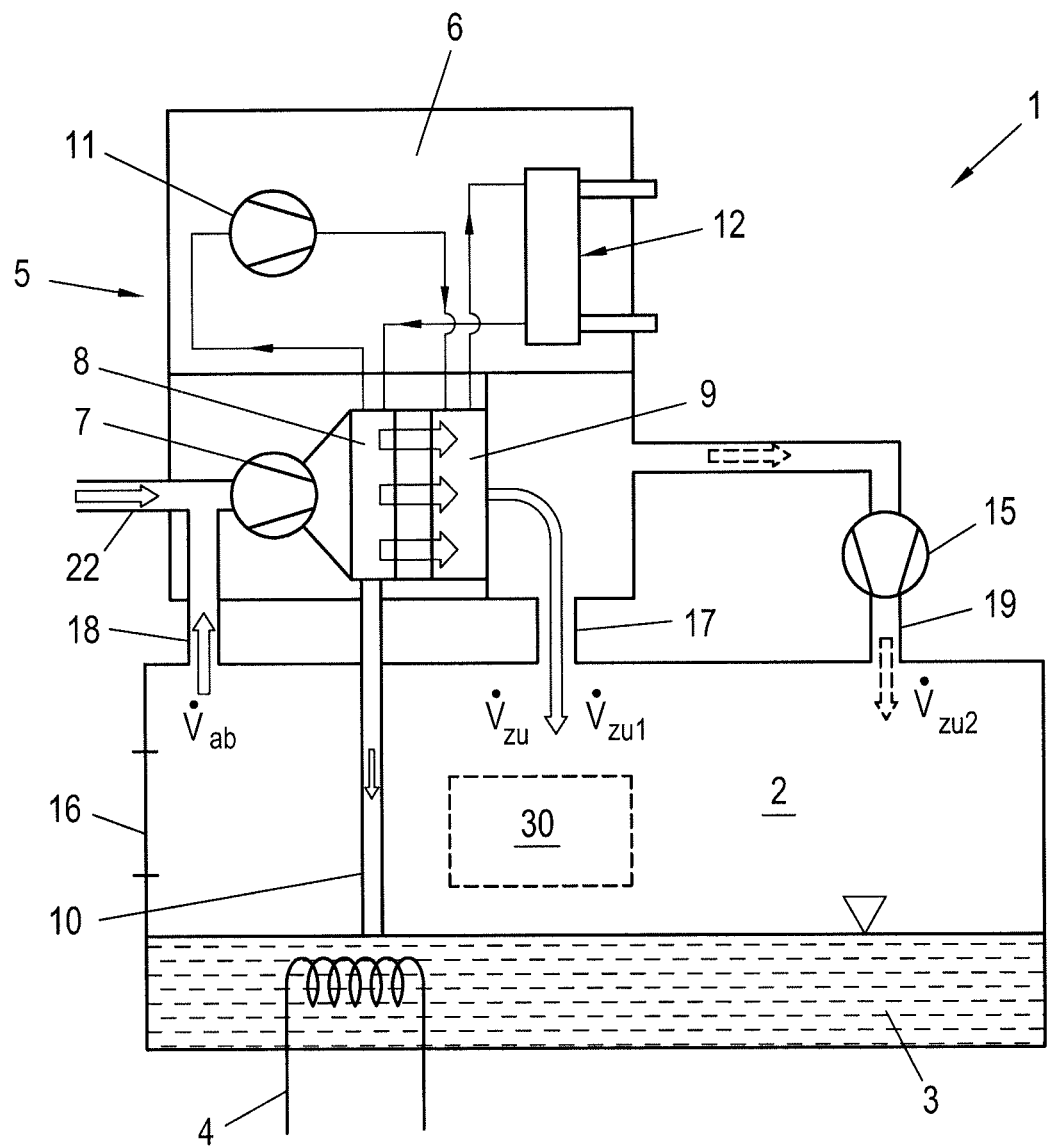

| | | |
|---|---|---|
| DE | 37 34 994 | 2/1989 |
| DE | 102 02 945 | 8/2003 |
| DE | 10 2008 039 747 | 6/2010 |
| EP | 0 053 727 | 6/1982 |
| EP | 0 492 814 | 7/1992 |
| EP | 0 940 167 | 9/1999 |
| SU | 1736637 | 5/1992 |

METHOD AND A CLEANING SYSTEM FOR CLEANING INDUSTRIALLY PRODUCED COMPONENTS

The present invention relates to a method and a cleaning system for cleaning industrially produced components, comprising a cleaning chamber and a suction unit for suctioning off waste air from the cleaning chamber, and a recovery device in which a cooling register, through which waste air is guided and thereby is cooled and dried, and a heat register are arranged, wherein the cooling register and the heat register are integral part of a refrigeration device, and wherein the suctioned-off waste air in the recovery device is guided through the heat register of the refrigeration device and thereby is substantially heated to the temperature of the waste air, and the dried waste air heated in this manner is supplied to the cleaning chamber as preheated dry supply air via a supply air line.

Systems for cleaning industrially produced components, e.g., machined components, need significant resources during operation such as, e.g., water, cleaning agents and energy. The cause for such losses lies essentially in the fact that the components have to be cleaned with heated cleaning agents, as a result of which cleaning agent vapors (supersaturated steam) are formed which previously were simply suctioned off the system and released into the environment. Thus, on the one hand, water and cleaning agents and, on the other, heat energy that is contained in the discharged cleaning agent vapors are lost. Calculations for a typical cleaning system with a cleaning tank volume of 2000 l, a cleaning temperature of 60° C., a waste air volume of 4500 m$^3$ and a heat output of 110 kW resulted in a heat loss of 55 kW/h and a loss of water of 90 l/h, which makes the problem obvious. Another problem of discharging the cleaning agent vapors from the cleaning system is that together with the cleaning agent, the cleaner contained therein is also discharged at the same time. Thus, water and cleaner have to be continuously added into the system so as to compensate the amount lost through vaporization, whereby, on the one hand, cleaner is wasted and, on the other, the cleaning bath is also overdosed over time.

Of course, the discharged amount of waste air has to be supplied to the system again, which usually simply takes place via the hall air. However, the supplied hall air cools the interior of the cleaning system and the component to be cleaned. This has to be compensated again via the tank heater of the cleaning agent, which, of course, disadvantageously deteriorates the energy balance of the system. Primarily the subsequent processes such as, e.g., vacuum drying the component, require that the component has stored enough heat energy and has a sufficient intrinsic temperature. If now the component is cooled via the fed supply air, this is very disadvantageous.

When using robot manipulators in the system, e.g., for moving the components to be cleaned or for holding the cleaning or drying nozzles, moreover, it is important to exactly set and maintain the surrounding conditions such as, e.g., air humidity, cleaner content in the air, etc., which was difficult or not at all possible to achieve with the previous systems. This can otherwise result in shorter service intervals for the robots and in associated system failures.

Another typical source of losses in such systems is the component change since for this, the system has to be opened resulting in an air exchange between the system interior and the surroundings. The air exchange takes place due to the fact that because of the high temperature in the system, the pressure within the system is also higher with respect to the surroundings. When the bulkhead door is open, thus, cleaning agent vapors escape to the outside. When the bulkhead door is open, thus, cleaning agent vapors escape to the outside. Of course, such an air exchange results in undesirable resource losses (cleaning agent, heat), which deteriorates the energy balance of the system.

In order to prevent such a waste of resources, industrial systems have already become known which recover the heat contained in the suctioned-off water vapor and the water contained therein. Thus, e.g., from U.S. Pat. No. 4,402,332 A, a system is known for pretreating car bodies prior to painting, wherein the water vapor developing during the cleaning of the car bodies is condensed on cooled condenser surfaces. The separated water is collected and fed back into the process. Furthermore, the condensation heat is utilized, e.g., in a heat exchanger for heating supply air supplied into the system, or in a heat pump for a process that requires heat. However, in such a system, no air is circulated; it is only provided that the generated water vapor does not escape to the outside without being utilized.

DE 30 38 275, in turn, shows a system for heat recovery in metal cleaning machines. For this purpose, the water vapor forming in the system is suctioned off by means of a ventilator and is supplied to a recovery system. In said recovery system, the water vapor is passed through a vaporizer of a refrigeration device, on which vaporizer the water vapor condenses. The separated water is collected and recirculated into the cleaning bath. The cleaning agent is circulated via a heat exchanger of the refrigeration device, as a result of which the cleaning agent is heated, and less energy for heating the cleaning agent is required. The recovered heat can also be used for preheating the supply air flowing into the cleaning system. However, this requires an auxiliary heater for the cleaning agent in the system since with this system, the temperature of the preheated supply air always lies below the temperature of the suctioned-off waste air and the supply air thus has a cooling effect in the system, which is a disadvantage for the entire process, as already explained above. In addition, a complex air volume control is to be provided here. Moreover, in such a system, the entire heat and the entire water are not recovered since through the amount of air discharged to the outside, residual losses to the surroundings always occur.

From DE 10 2008 039 747 B4 it is known to condense the humid waste air from an industrial process (cleaning, drying, flushing) in a vaporizer so as to recover the water contained in the suctioned-off vapors. The resulting heat is dissipated into a subsequent air/air and air/water heat exchanger, wherein the air/air heat exchanger shall be implemented as a refrigeration device. Here too, the supply air flow cannot reach the temperature of the waste air flow, as a result of which additional heat has to be fed into the system thereby deteriorating the total energy balance.

From EP 053 727 A1, in turn, a washing machine with integrated dryer is known in which solvent and heat are recovered during the drying process. The recovery of resources takes place in a heat pump through which the drying air is passed. For this, first heat is extracted from the drying air for condensing the solvent vapors, which heat is recirculated into the drying air prior to recirculating the drying air into the washing drum. However, a washing process is a long process and relatively few changes of items to be washed take place so that the process of changing the items to be washed does not have to be taken into account when considering the overall resources. Moreover, when changing the items to be washed, the entire solvent and the heat contained therein is already extracted so that from the point of view of a loss of resources, the change of the items to be washed is insignificant.

It is therefore an object of the present invention to reduce the loss of resources, in particular of cleaning agents and heat (energy), in a cleaning system and/or in a method for cleaning industrially produced components.

This object is achieved in that the supply air line leads into a cleaning chamber in the region of a bulkhead door, as a result of which an air curtain forms in the region of the bulkhead door. Thus, an air circulating operation is implemented in which the suctioned-off waste air is circulated in the cleaning system and can be recirculated into the system again with substantially the same temperature. Thus, there is no exchange of waste air with the surroundings, but the heat contained in the waste air is recovered and is recirculated into the process again. In this manner, the energy input for operating the cleaning system can also be significantly reduced since the supply air has process temperature and therefore no additional heat supply is necessary in the system during the operation. Likewise, in the case of an open bulkhead door, an air exchange and thus a resulting loss of resources is substantially prevented by forming an air curtain in front of the bulkhead door.

Also, it is advantageous if, with the bulkhead door being open, a portion of the supply air is discharged into the surroundings through the blow-off line. Here, only small amounts of supply air have to be blown off for reducing the pressure in the cleaning chamber to approximately the ambient pressure so that an air exchange and a resulting loss of resources is at least reduced when the bulkhead door is open. Blowing off dried preheated supply air constitutes a significantly lower loss of resources than cleaning agent vapors that escape to the outside through the open bulkhead door.

Particularly advantageous, the cleaning agent condensed in the cooling register is recirculated into the cleaning agent container through a recirculation line because then the cleaning agent discharged together with the waste air from the cleaning system can be completely recirculated. Here, the cleaning agent still contained in the waste air downstream of the cooling register is also recirculated through the circulating-air operation, as a result of which virtually no loss of cleaning agent caused by the suction occurs. Through the specific recirculation of the cleaning agent condensate into the cleaning cycle, the consumption of water and cleaner is therefore considerably reduced. Continuously adding to the cleaning bath level due to vaporization is therefore eliminated. Thus, also the cleaner concentration remains constant over a longer period and ensures a stable cleaning process.

These solutions also enable a stable cleaning chamber climate, which is particularly advantageous for the use of robots in the cleaning system.

If a blow dryer is provided, a portion of the heated dried waste air is fed in an advantageous manner into the cleaning chamber via said blow dryer. Thus, also a drying process does not result in losses of heat and/or cleaning agent. As a result, the component also does not lose heat during the drying process, as a result of which the component is optimally prepared for subsequent processes such as, e.g., vacuum drying.

In the refrigeration device, advantageously, a refrigerating circuit is implemented in which a refrigerant in the cooling register absorbs heat from the waste air flowing through the cooling register, the compressor compresses the refrigerant and feeds it to the heat register where the refrigerant dissipates heat to the waste air flowing through the heat register, the refrigerant is conveyed from the heat register into the cooling unit where the refrigerant continues to cool down, and refrigerant is conveyed from the cooling unit into the cooling register. Such a refrigerating circuit can be operated with very small losses. Moreover, the heat absorption of the refrigerant in the cooling register is improved through the additional cooling in the cooling unit, as a result of which the temperature difference for the heat transport is also advantageously increased. In this manner, the supply air can be brought to the temperature of the waste air without additional major efforts.

If an aerosol is introduced into the waste air from the cleaning chamber, the efficiency of the condensation can be improved, as a result of which more heat energy and more condensate can be recovered from the waste air.

Figure 2:
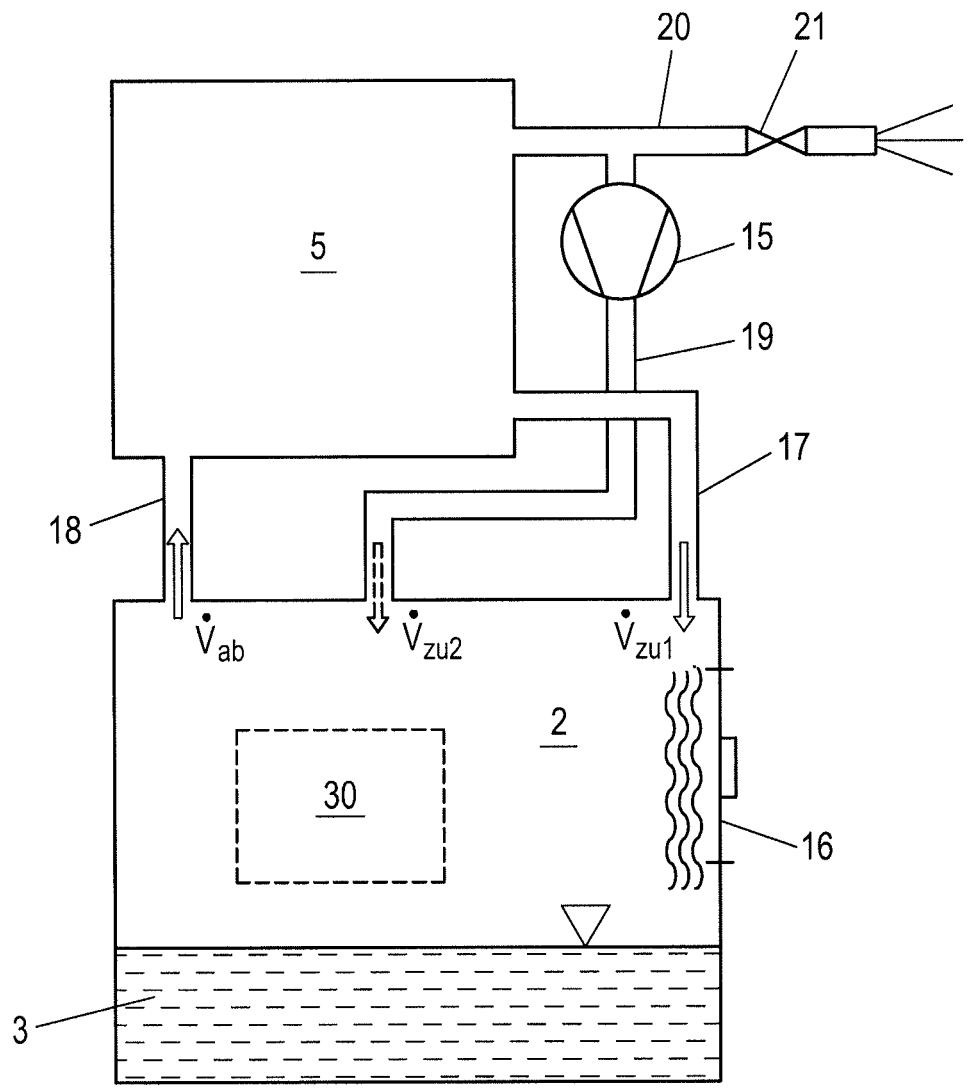

The present invention is described hereinafter with reference to the exemplary and schematic drawings, in which:

FIG. 1 shows an advantageous system diagram; and
FIG. 2 shows an advantageous system diagram.

The cleaning system 1 according to the invention as schematically illustrated in the FIGS. 1 and 2 comprises a cleaning chamber 2, in which during operation a component 30 is arranged, as indicated in FIG. 1, a cleaning agent container 3 and a recovery device 5. The cleaning agent in the cleaning agent container 3 is maintained at a certain operating temperature, e.g., 65° C. For this purpose, a cleaning agent heater 4, as indicated in FIG. 4, can be provided in the cleaning agent container 3, e.g., so as to bring the cleaning agent to operating temperature or to maintain it at operating temperature. As a cleaning agent, e.g., water with a chemical cleaner can be used. The type of cleaning of the component 30 in the cleaning chamber 2 is not relevant for the invention. For example, spray nozzles can be provided in the cleaning chamber 2, or a robot-guided nozzle or a robot-guided component 30 can be used. The cleaning process causes cleaning agent vapors in the cleaning chamber 2, thus substantially supersaturated cleaning agent steam, which are to be discharged continuously. It is also possible that more than one component 30 is arranged in the cleaning chamber 2 at the same time.

For discharging the cleaning agent vapors, a suction device 7, e.g., a ventilator, is provided in the waste air line 18. In such industrial cleaning systems 1, approximately one hundred air changes per hour can be necessary in order to discharge the occurring cleaning agent vapors. In the case of a volume of, e.g., 30 m$^3$ in the cleaning chamber 2, the suction device thus has to be capable of circulating 3000 m$^3$/h of waste air. The suctioned-off waste air $\dot{V}_{ab}$ from the cleaning chamber 2 is supplied to the recovery device 5.

Upstream of the suction device 7, as shown in FIG. 1, or, respectively, upstream of the cooling register 8, a supply line 22 can lead into the waste air line 18, by means of which supply line an aerosol, e.g., an aerosol from air and water can be introduced into the waste air $\dot{V}_{ab}$ so as to improve the efficiency of the condensation, as a result of which more heat energy and more condensate can be recovered from the waste air. In the recovery device 5, a cooling register 8 (vaporizer of the refrigeration machine 6) is arranged through which the waste air $\dot{V}_{ab}$ discharged from the cleaning chamber 2 is guided. The cooling register 8, e.g., can be provided with a multiplicity of cooling ribs or cooling coils along which the waste air flows. In the cooling register 8, the waste air $\dot{V}_{ab}$ is cooled down and effects a condensation of the cleaning agent contained in the waste air $\dot{V}_{ab}$. The condensed cleaning agent is conveyed through a condensate line 10 into the cleaning agent container 3. In this manner, the majority of the cleaning agent contained in the waste air $\dot{V}_{ab}$ is recovered.

The cooled dried waste air $\dot{V}_{ab}$ is further conveyed into a heat register 9 (condenser of the refrigeration device 6) where the waste air $\dot{V}_{ab}$ is heated substantially to the interior temperature in the cleaning chamber 2, thus, e.g., to 65°. The heat register 9, e.g., can be provided with a multiplicity of heating ribs or heating coils along which the waste air flows. The heated waste air $\dot{V}_{ab}$ is now fed to the cleaning chamber 2 again in the form of dried preheated supply air $\dot{V}_{zu1}$ via the supply air line 17. In this manner, a circulating-air operation is implemented in which nothing has to be dissipated to the surroundings. Thus, a closed circuit is implemented in which almost no cleaning agent can get lost.

In order to be able to efficiently use and recover the heat quantity contained in waste air $\dot{V}_{ab}$, a refrigeration device 6 is provided in the recovery device 5. The refrigeration device 6 comprises the cooling register 8 (vaporizer), a compactor 11 (e.g. a compressor), a cooling unit, here e.g., a heat exchanger 12, and the heat register 9, which are connected to each other through lines in which a suitable refrigerant is carried. The refrigerant flows through the cooling register 8, e.g., through cooling ribs and, by means of condensation in the cooling register 8, absorbs heat from the waste air $\dot{V}_{ab}$, wherein the refrigerant can also transform into the gaseous state of aggregation. The heated refrigerant is compressed in the compressor 11 and thus is further heated and fed to the heat register 9 where it flows through the heating ribs or heating coils, for example. There, the refrigerant dissipates the heat previously extracted from the waste air to the waste air $\dot{V}_{ab}$ again and thus heats the waste air, wherein the refrigerant can be liquefied again at the same time. The refrigerant is further guided through a heat exchanger 12, e.g., a water or air heat exchanger, in which the refrigerant is further cooled down so as to increase the temperature difference between the refrigerant and the waste air temperature. From the heat exchanger 12, the refrigerant is fed to the cooling register 8 again, whereby the refrigerating circuit is closed. The heat exchanger 12 serves for compensating the inevitably occurring losses in the refrigerating circuit, which is necessary if, advantageously, the supply air $\dot{V}_{zu}$ shall be brought substantially to the same temperature as the waste air $\dot{V}_{ab}$. The heat of the waste air $\dot{V}_{ab}$ is used here completely for preheating the supply air $\dot{V}_{zu}$, which is very advantageous in terms of energy.

It is also possible that instead of the heat exchanger 12, a vaporizer of a further refrigeration device is arranged as a cooling unit in the refrigeration device 6, whereby the heat remaining in the refrigerant downstream of the heat register could also be made available for further use.

Furthermore, in the cleaning system 1, a blow dryer 15 can be provided by means of which the cleaned component 30 in the cleaning chamber 2 can be blown off with dry air, e.g., so as to effect a predrying of the component 30 subsequent to the cleaning. For this, the blow dryer 15 removes via a blow dryer line 19 a portion of the dried preheated waste air and blows it into the cleaning chamber 2, as a result of which the supply air $\dot{V}_{zu}$ is divided into two volume flows $\dot{V}_{zu1}$ and $\dot{V}_{zu2}$.

During the operation of the cleaning system 1, a continuous circulating-air operation is provided through the suction device 7, wherein, advantageously, the blow dryer 15 is cyclically activated for a given time period, e.g., at the end of each cleaning process. However, it is also possible that the blow dryer 15 runs continuously.

Placing the component 30 into the cleaning system 1 and removing it is carried out, e.g., through a bulkhead door 16 in the housing of the cleaning chamber 2. Of course, opening the bulkhead door 16 is a weak point in the total energy balance since due to the temperature difference between the cleaning chamber 2 and the surroundings when the bulkhead door 16 is open, there is also a pressure drop from the inside to the outside and as a result, cleaning agent vapors escape to the outside resulting in a loss of resources each time the bulkhead door 16 is opened, e.g., during the component change. In order to prevent this, it can be provided that the recirculated supply air $\dot{V}_{zu}$ is blown from above into the cleaning chamber 2 in the region of the bulkhead door 16, see FIG. 2, whereby in the cleaning chamber 2, behind the bulkhead door 16, an air curtain is formed which substantially prevents the cleaning agent vapors from escaping to the outside when the bulkhead door 16 is open.

Likewise, it is also possible that in the supply air line 17 or in the dry blower line 19 a blow-off line 20 is arranged, see FIG. 2, through which, when the bulkhead door 16 is open, a small amount of supply air $\dot{V}_{zu}$ can be blown off. This results in that for the short time the bulkhead door 16 is open, e.g., 2-3 s, less supply air is supplied into the cleaning chamber 2 than waste air is discharged. Thus, the pressure prevailing in the cleaning chamber 2 is reduced for a short time, preferably to the ambient pressure, so that substantially no air exchange takes place when the bulkhead door 16 is open.

The air curtain and blowing off the supply air can be provided alternatively or at the same and can also be used in systems in which the supply air $\dot{V}_{zu}$ is not brought to the temperature of the waste air $\dot{V}_{ab}$.

The recovery device 5 can be controlled such that a desired temperature of the supply air $\dot{V}_{zu}$, preferably the temperature of the waste air $\dot{V}_{ab}$, is set. For this purpose, e.g., the circulated air volume can be kept at a constant level and the refrigeration device 6, e.g., the compressor 11 or the cooling unit, e.g., the heat exchanger 12, can be controlled. However, an advantageous operation arises if the refrigeration device 6 is operated at an advantageous stable operating point (e.g., high efficiency) and the circulated air volume is set or controlled such (e.g., via the capacity of the suction device 7) that the temperature of the supply air reaches the same value as the waste air temperature. Of course, the system components can be dimensioned so as to enable such an optimum under favorable operating conditions (e.g., number of air changes in the system).

The invention claimed is:

1. A cleaning system for cleaning industrially produced components, comprising a cleaning chamber and a suction device for suctioning off waste air ($\dot{V}_{ab}$) from the cleaning chamber, and a recovery device in which a refrigeration device with a cooling register through which the waste air ($\dot{V}_{ab}$) is guided and thus cools and dries, and a heat register are arranged, wherein the cooled and dried waste air ($\dot{V}_{ab}$) in the recovery device is guided through the heat register of the refrigeration device and is heated to the temperature of the suctioned-off waste air ($\dot{V}_{ab}$), and the waste air ($\dot{V}_{ab}$) heated and dried in this manner is supplied to the cleaning chamber as preheated dried supply air ($\dot{V}_{zu}$) via a supply air line, wherein the supply air line leads into the cleaning chamber in the region of a bulkhead door in order to form an air curtain in the cleaning chamber behind the bulkhead door by the supply air ($\dot{V}_{zu}$) supplied.

2. The cleaning system according to claim 1, wherein a blow-off line with a blow-off valve is provided in the supply air line.

3. The cleaning system according to claim 1, wherein a condensate line is provided for recirculating the cleaning agent condensed in the cooling register into a cleaning agent container of the cleaning system.

4. The cleaning system according to claim 1, wherein a blow dryer is provided which removes a portion of the heated dried waste air ($\dot{V}_{ab}$) via a blow dryer line and supplies it as supply air ($\dot{V}_{zu2}$) into the cleaning chamber.

5. The cleaning system according to claim 4, wherein a blow-off line with a blow-off valve is provided in the blow dryer line.

6. The cleaning system according to claim 1, wherein a compressor and a cooling unit are provided in the refrigeration device, and through the cooling register, a refrigerant flows and thereby absorbs heat from the waste air ($\dot{V}_{ab}$) flowing through the cooling register, that the compressor compresses the refrigerant and supplies it to the heat register where it dissipates heat to the waste air ($\dot{V}_{ab}$) flowing through the heat register, that the refrigerant flows from the heat register into the cooling unit where the refrigerant continues to cool down, and that refrigerant flows from the cooling unit into the cooling register so as to close the cooling circuit.

7. The cleaning system according to claim 1, wherein a supply line leading into the waste air line is provided for introducing an aerosol into the waste air ($\dot{V}_{ab}$) from the cleaning chamber.

8. A method for recovering resources in a cleaning system for cleaning industrially produced components, in which waste air ($\dot{V}_{ab}$) from a cleaning chamber of the cleaning system is conveyed through a cooling register of a refrigeration device and thereby cooled and dried and the waste air ($\dot{V}_{ab}$) from the cooling register is conveyed into a heat register of the refrigeration device and is heated there to the temperature of the waste air ($\dot{V}_{ab}$), and the heated dried waste air ($\dot{V}_{ab}$) is recirculated from there as supply air ($\dot{V}_{zu}$) into the cleaning chamber again, wherein the supply air ($\dot{V}_{zu}$) is supplied into the cleaning chamber so as to form an air curtain behind a bulkhead door of the cleaning system.

9. The method according to claim 8, wherein a portion of the supply air ($\dot{V}_{zu}$) is discharged into the surroundings via a blow-off line when the bulkhead door is open.

10. The method according to claim 8, wherein the cleaning agent condensed in the cooling register is recirculated into a cleaning agent container again.

11. The method according to claim 8, wherein a portion of the waste air ($\dot{V}_{ab}$) heated in the heat register is recirculated into the cleaning chamber via a blow dryer.

12. The method according to claim 8, wherein in the cooling register, a refrigerant absorbs heat from the waste air ($\dot{V}_{ab}$) flowing through the cooling register, that the refrigerant is compressed in a compressor and is supplied to the heat register where it dissipates heat to the waste air ($\dot{V}_{ab}$) flowing through the heat register, that the refrigerant is conveyed from the heat register into a cooling unit where the refrigerant is further cooled down, and that refrigerant is conveyed from the cooling unit into the cooling register.

13. The method according to claim 8, wherein an aerosol is introduced into the waste air ($\dot{V}_{ab}$) from the cleaning chamber.

* * * * *